UNITED STATES PATENT OFFICE.

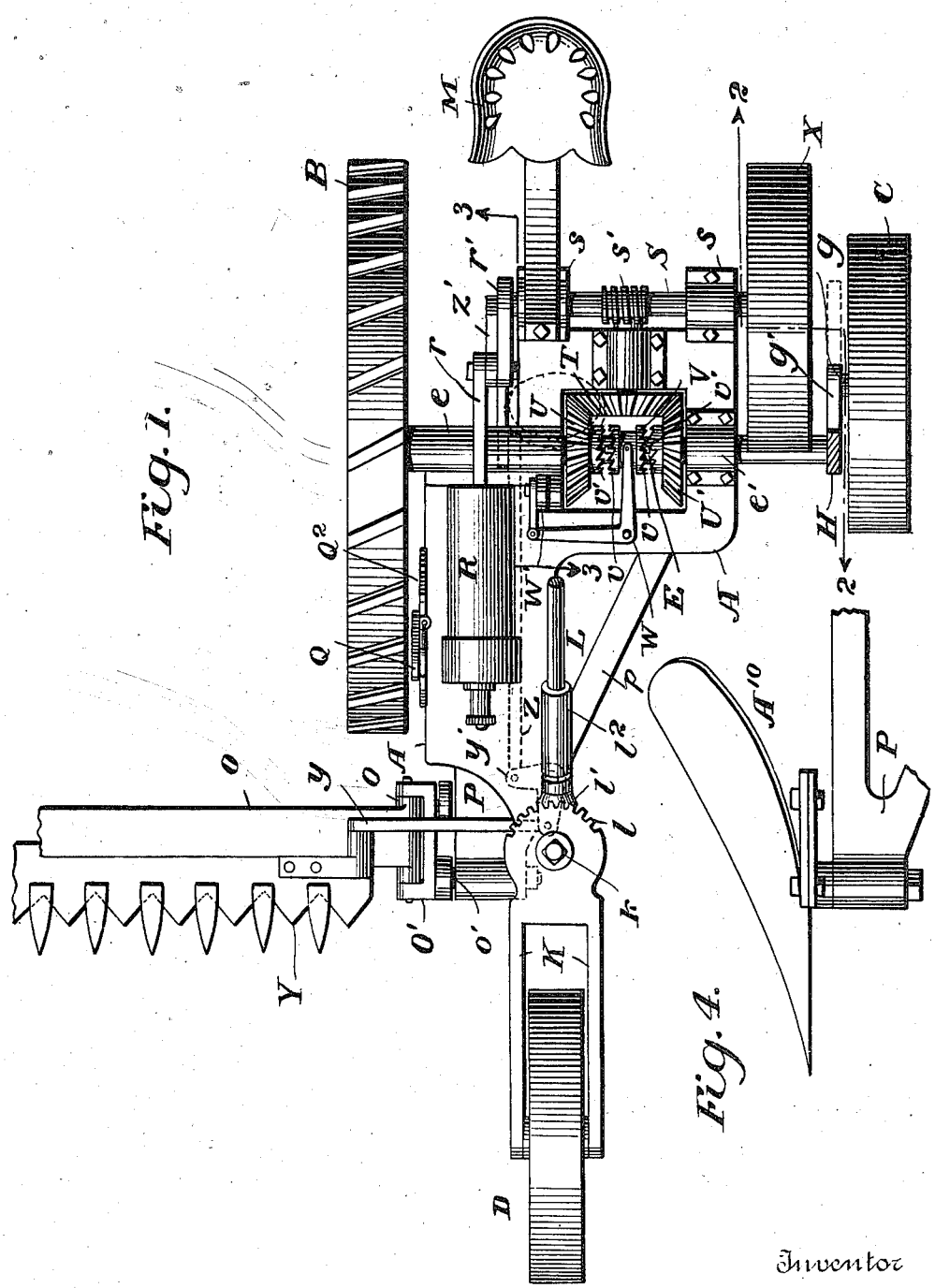

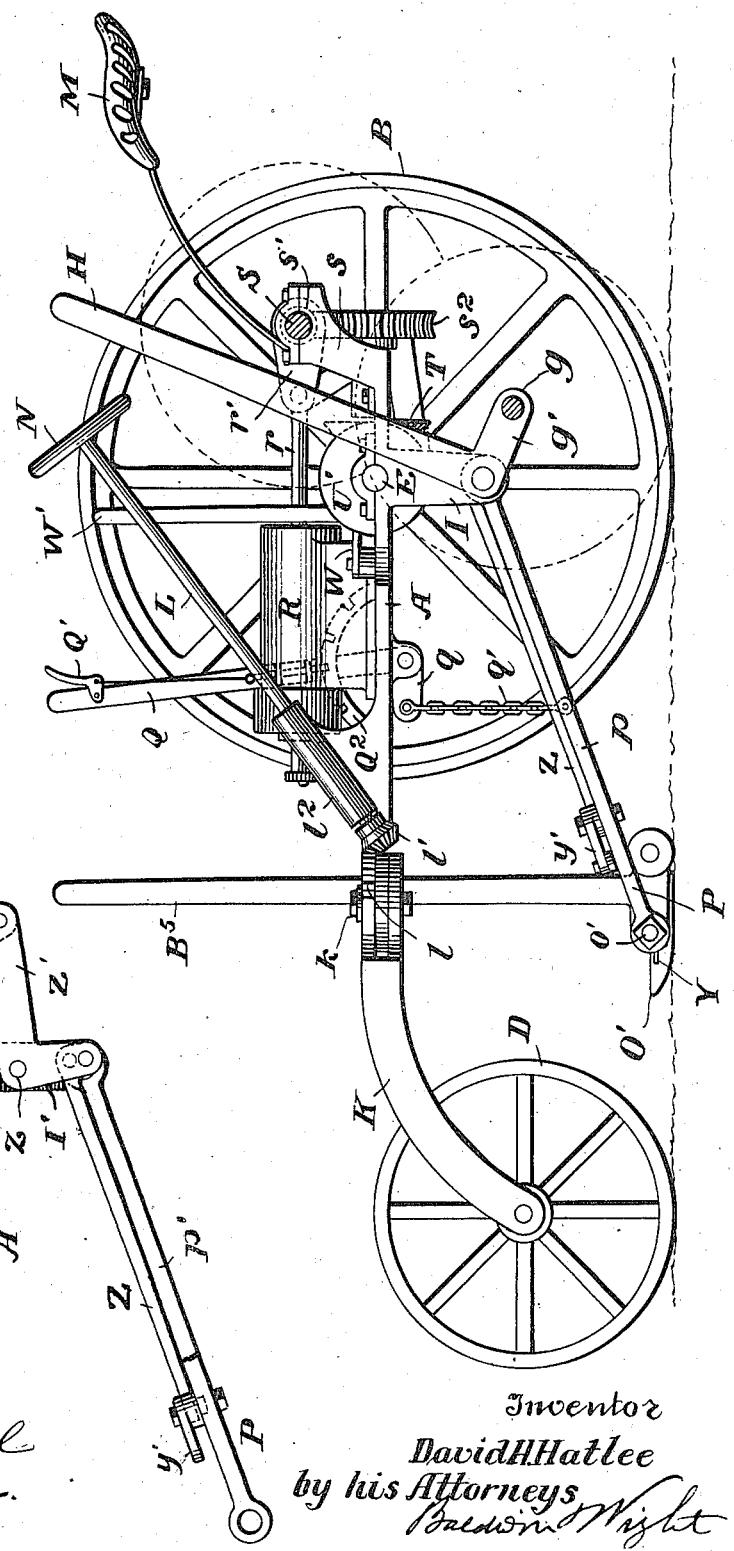

DAVID HENRY HATLEE, OF CLIFTON PARK, NEW YORK, ASSIGNOR OF ONE-FOURTH TO DANIEL P. McQUEEN, OF SARATOGA SPRINGS, NEW YORK.

AUTOMOBILE AGRICULTURAL MACHINE.

996,714.     Specification of Letters Patent.    Patented July 4, 1911.

Application filed May 16, 1910. Serial No. 561,634.

*To all whom it may concern:*

Be it known that I, DAVID H. HATLEE, a citizen of the United States, residing in Clifton Park, in the county of Saratoga and State of New York, have invented certain new and useful Improvements in Automobile Agricultural Machines, of which the following is a specification.

My invention relates to agricultural machines of the class in which the machine is propelled by a motor or engine mounted on the machine, which operates grain or grass cutting or other mechanism carried by the machine, and the object of my invention is to simplify machines of this class, render them more efficient, more durable and more easily managed.

In the accompanying drawings I have shown my improvements embodied in a mowing machine, but they may be included in machines of different kinds.

Figure 1 is a top plan view of so much of the motor driven mowing machine as is necessary to illustrate my improvements. Fig. 2 shows a vertical section thereof on the line 2—2 of Fig. 1. Fig. 3 is a detail view in vertical section on the line 3—3 of Fig. 1. Fig. 4 shows how a plow may be substituted for the cutting mechanism.

The main frame A of the machine is preferably supported on three wheels, B, C, and D. The main or driving wheel B is rigidly secured to an axle E having sleeve bearings $e$ $e'$ on the top of the frame. The wheel C on the opposite side of the machine is free to turn on a stud axle $g$ projecting from an arm $g'$ rigid with a lever H pivotally connected with a bracket or hanger I extending downwardly from the main frame. By means of the lever H the machine may be leveled, tilted, or raised and lowered so as to accommodate hills, inclines or other irregularities in the field. The wheel D, which is the guiding or pilot wheel, is mounted in a bifurcated frame K pivotally connected at $k$ to the front end of the main frame. This frame is formed with a segment of teeth $l$, meshing with a beveled pinion $l'$ on the lower end of the shaft L mounted to turn in a sleeve bearing $l^2$ on the main frame and extending upwardly and rearwardly toward the seat M, its upper rear end being provided with a hand wheel N. By operating the hand wheel the pilot wheel may be adjusted to properly guide the machine.

The finger bar O of the mowing machine is hinged at $o$ to a shoe O' pivoted at $o'$ to the lower front end of a frame P, one arm $p$ of which is pivoted to the bracket or hanger I while the other arm $p'$ is pivotally connected with a bracket or hanger I' on the opposite side of the machine. The frame P is freely hinged to the frame A and may be raised or lowered by a lever Q pivoted to the main frame and having an arm $q$ connected to the frame P by a chain $q^2$. The lever Q is provided with latch mechanism Q', coöperating with a toothed segment Q² by which means the frame P may be held in an elevated position or quickly lowered.

An engine or motor R of any suitable kind may be mounted on the main frame in the manner indicated, and it is connected by means of the rod $r$ with a crank arm $r'$ projecting from a worm shaft S mounted in bearings in brackets $s$ projecting upwardly from the rear part of the main frame. The worm $s'$ on the shaft gears with a wheel $s^2$ on a shaft carrying a bevel gear T meshing with the bevel spur wheels U, U' mounted to turn loosely on the main shaft E but at all times gearing with the wheel T.

V indicates a clutch block mounted to slide on the shaft E and provided on opposite sides with clutch teeth $v$ adapted to engage corresponding teeth $v'$ on the wheels U, U'. W indicates a horizontally arranged bell crank lever pivoted to the main frame and connected with an operating lever W' by means of which either of the wheels U, U' may be engaged by the clutch. By the mechanism described the main shaft E may be operated by the motor or engine to turn in either direction to drive the machine either forward or backward. The worm shaft carries a band pulley and fly wheel X. When desired, the shaft E may be entirely disconnected from the engine and the pulley may be belted to any stationary machine which it is desired to operate.

The cutter bar Y is connected to a rod $y$ with a bell crank lever $y'$ pivoted to the lower end of the frame P and connected by a rod Z to a bell crank lever Z' pivoted at $z$ to the bracket or hanger I' and connected at its rear end by a link $z'$ with the piston rod $r$ of the engine. By this mechanism the cutter bar may be operated from the engine as the machine advances, and the connections are such that the frame P, carrying the cutting mechanism, may be raised and lowered without interfering with the connections between the engine and the cutters.

B⁵ indicates a lever which may be operated to tilt the cutter bar. This is common in this class of machines. If desired, the cutting mechanism may be removed and a plow A¹⁰ substituted, in which case the motor driving mechanism would of course be thrown out of operation by disconnecting some of the operative parts.

It will be observed that the engine or motor is connected first with a worm shaft and that motion is communicated from this shaft by means of a worm wheel to bevel pinions that are adapted to be connected with the main driving shaft. In this way a rapid motion is given to the worm shaft but a much slower motion is given to the bevel wheels which are constantly rotating. Wear on the bevel wheels is thus reduced and by this arrangement of gearing also great power is imparted to the driving shaft, sufficient to propel the machine. The gearing is very compact and is extremely light, which of course is very desirable in machines of this class.

I claim as my invention:

1. An automobile agricultural machine, comprising a main frame, a main or driving axle mounted in bearings therein and provided with a driving wheel, an engine or motor mounted on the main frame, a worm shaft driven thereby, connections between said worm shaft and the driving axle, an adjustable supporting wheel at the rear end of one side of the main frame, a pilot wheel at the front of the machine, a pivoted frame in which it is mounted, a shaft operatively connected with this frame, a hand wheel for operating the shaft, a frame arranged below the main frame and pivotally connected at its rear end therewith, means for raising and lowering this frame, a shoe to which the lower end of said frame is connected by which its lower end is supported and which is adapted to have connected with it parts of an agricultural machine, and means carried by said frame and connected with the engine for operating the part attached to the shoe.

2. An automobile agricultural machine, comprising a main frame, a main or driving axle mounted in bearings therein and provided with a driving wheel, an engine or motor mounted on the main frame, a worm shaft driven thereby, connections between said worm shaft and the driving axle, brackets or hangers attached to and extending downwardly from the main frame, an adjustable supporting wheel pivotally connected with one of said hangers, a frame located below the main frame and pivotally connected with both of said hangers, means for raising and lowering this frame, a shoe pivotally connected to the lower front end of said frame, a finger bar hinged to the shoe, a cutting blade carried by said finger bar, a bell-crank lever mounted on the lower end of the hinged frame, connections supported by said frame and which may be raised and lowered therewith between said bell-crank lever and the engine, a pilot wheel, and means for steering it.

In testimony whereof, I have hereunto subscribed my name.

DAVID HENRY HATLEE.

Witnesses:
 JAMES H. BEMS,
 KATHERINE G. MONAHAN.